UNITED STATES PATENT OFFICE.

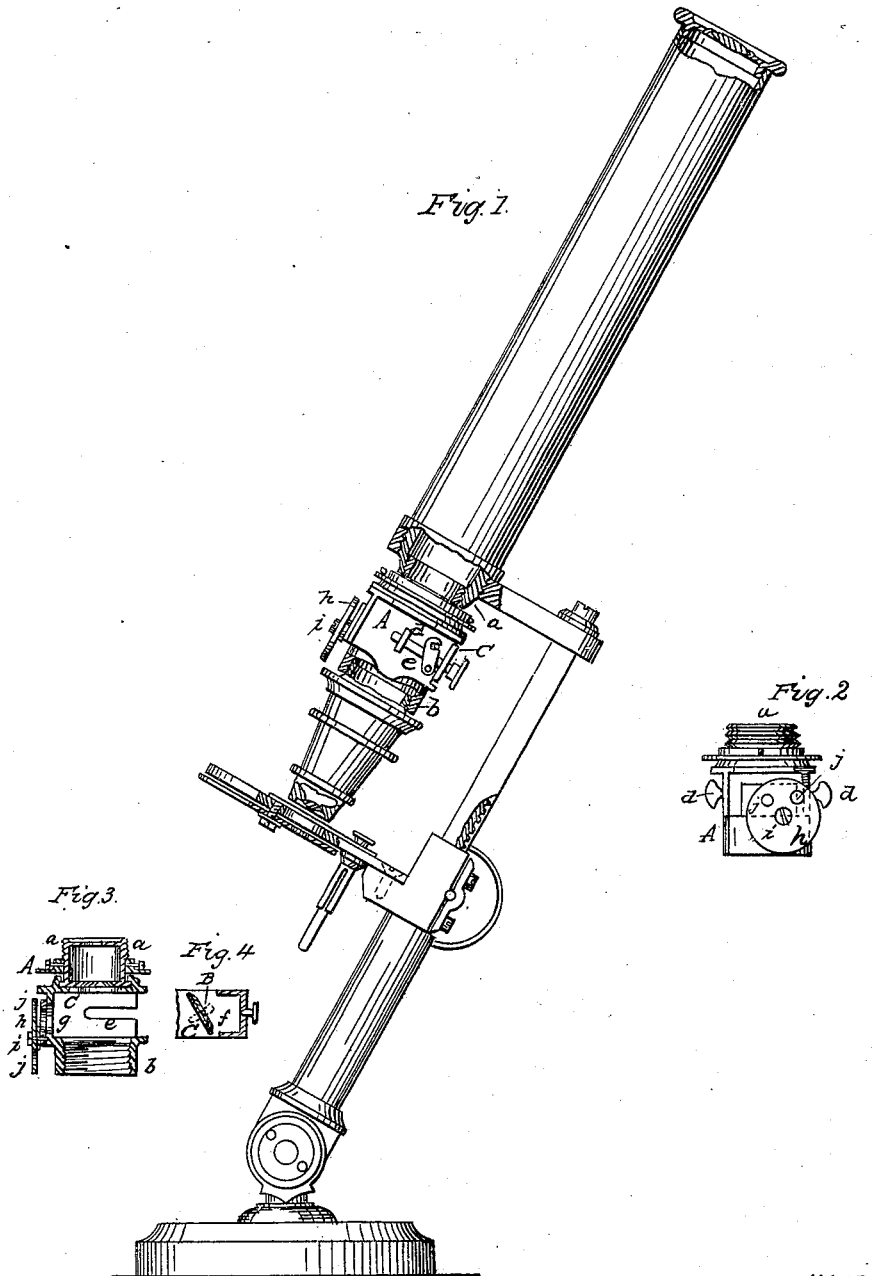

HAMILTON L. SMITH, OF GAMBIER, OHIO.

IMPROVEMENT IN MICROSCOPES.

Specification forming part of Letters Patent No. 52,901, dated February 27, 1866.

*To all whom it may concern:*

Be it known that I, HAMILTON L. SMITH, of Gambier, in the county of Knox and State of Ohio, have invented a new and useful Improvement in Microscopes; and I do hereby declare that the following is a full, clear, and exact description thereof, which will enable others skilled in the art to make and use the same, reference being had to the accompanying drawings, forming part of this specification, in which—

Figure 1 represents a sectional side elevation of a microscope constructed according to this invention. Fig. 2 is a front elevation of the reflector-case detached. Fig. 3 is a vertical central section of the case when the reflector has been removed. Fig. 4 is a longitudinal section of the reflector-slide.

Similar letters of reference indicate like parts.

This invention consists in the use of a movable reflector inserted into the tube of a microscope and arranged so as to transmit the light down through the lens on the object in such a manner that by the action of said lens or object-glass of the microscope the light is condensed on the object to be viewed, and an object viewed as opaque will be illuminated for the microscope.

It consists, further, in the application of an adjustable disk with two or more holes of different sizes, in combination with the aperture in the side or front of the reflector-case, through which light is admitted on the reflector in such a manner that by turning said adjustable disk the quantity of light admitted to the instrument can be regulated to suit the object to be viewed.

It consists, finally, in combining with the reflector a slide, which moves in suitable ways in the reflector-case in such a manner that a double motion can be given to the reflector—viz., a revolving and transversely-sliding motion—and, furthermore, the reflector can be readily removed and replaced by another whenever it may be desirable.

A represents a case, made of metal or any other suitable material, square, round, or in any other desirable form or shape capable of receiving the reflector B, Fig. 4. Said case is provided with a male thread, *a*, at its upper end, whereby it can be secured in the end of the tube of a microscope, and with a female thread, *b*, at its lower end, to receive the lens-tube of the microscope.

The reflector B is secured in a slide, C, which fits in a transverse cavity, *c*, in the case A, and it (the reflector) is hung upon gudgeons *d*, which extend through the sides of the case and are provided with thumb-pieces, whereby the reflector can be readily adjusted to any desired inclination. Slots *e* in the sides of the case allow the gudgeons to move back and forth with the slide C, and said slots are open at their rear ends, so that the slide can be conveniently withdrawn, if desired. By this arrangement a double motion can be given to the reflector—viz., a revolving motion and transverse sliding motion—and the operation of adjusting the same in the proper position is thereby considerably facilitated. Said reflector consists of a metal plate with a highly-polished reflecting-surface, or it may be made of any other suitable material, and it is perforated with a hole, *f*, in its center, so that it does not obstruct the line of sight extending down through the center of the microscope.

An aperture, *g*, Fig. 3, in the front wall of the case A permits the light to fall on the reflector, and by the action of said reflector the light is thrown down on the object through the lens or object-glass. In front of the aperture *g* a disk, *h*, is placed, which turns on a pivot, *i*, and which is provided with three (more or less) holes, *j*, of different sizes. By turning the disk either of the holes can be brought opposite the aperture *g*, and the quantity of light admitted to the reflector can be adjusted to suit circumstances.

It must be remarked that the reflector B might be arranged in a great many different ways, and I do not wish to confine myself to the precise mechanical arrangement shown in the drawings, although I find that this arrangement has several advantages, which it would not be possible to attain by other devices or means for holding the reflector above the object-glass.

What I claim as new, and desire to secure by Letters Patent, is—

1. The use in a microscope of a reflector arranged above the object, so as to condense the light through the lens on the object to be viewed, substantially as and for the purposes set forth, said light being taken from one side and not transmitted from below.

2. The adjustable slide C, in combination with the reflector B and case A, constructed and operating substantially as and for the purpose described.

3. The arrangement of the adjustable disk $h$, of two or more holes of different sizes, in combination with aperture $g$ in the case A and with the reflector B, constructed and operating substantially as and for the purpose set forth.

HAMILTON L. SMITH.

Witnesses:
G. S. BENEDICT,
J. K. JONES.